(12) United States Patent
Sarkees

(10) Patent No.: US 7,805,117 B2
(45) Date of Patent: Sep. 28, 2010

(54) METHOD AND APPARATUS FOR MINIMIZING NOISE IN A TRANSMITTER

(75) Inventor: George R. Sarkees, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 318 days.

(21) Appl. No.: 11/363,732

(22) Filed: Feb. 28, 2006

(65) Prior Publication Data

US 2007/0202821 A1    Aug. 30, 2007

(51) Int. Cl.
*H01Q 11/12* (2006.01)
*H04B 1/04* (2006.01)

(52) U.S. Cl. .................. 455/127.3; 455/14; 455/115.1; 455/127.2

(58) Field of Classification Search .............. 455/127.3, 455/127.2, 14, 67.11, 67.13, 91, 114.2, 115.1, 455/128, 194.2, 213, 232.1, 240.1, 247.1, 455/251.1, 253.2, 296, 307, 311, 333, 339–341
See application file for complete search history.

(56) References Cited

U.S. PATENT DOCUMENTS

| | | | |
|---|---|---|---|
| 5,955,921 A * | 9/1999 | Ide et al. ..................... 330/254 |
| 5,990,746 A | 11/1999 | Samuels | |
| 6,498,927 B2 | 12/2002 | Kang et al. | |
| 6,909,882 B2 | 6/2005 | Hayashi et al. | |
| 7,203,468 B2 * | 4/2007 | Narita et al. ............. 455/114.2 |
| 7,248,845 B2 * | 7/2007 | Dunn ...................... 455/127.1 |
| 2001/0051511 A1 | 12/2001 | Kakizaki et al. | |
| 2001/0055960 A1 * | 12/2001 | Abdelmonem .............. 455/307 |
| 2002/0025786 A1 * | 2/2002 | Brady et al. .................. 455/78 |
| 2002/0037698 A1 * | 3/2002 | Stafford et al. ............. 455/3.02 |
| 2002/0047744 A1 * | 4/2002 | Ichihara ...................... 330/133 |
| 2002/0142745 A1 * | 10/2002 | Kang et al. ............. 455/232.1 |
| 2003/0006881 A1 * | 1/2003 | Reyes ..................... 340/310.01 |
| 2003/0092419 A1 * | 5/2003 | Nobbe et al. ................ 455/324 |
| 2003/0179832 A1 * | 9/2003 | Greenwood et al. ......... 375/297 |
| 2003/0218501 A1 * | 11/2003 | Oshima et al. .............. 330/133 |
| 2003/0231054 A1 * | 12/2003 | Magoon et al. ................. 330/9 |
| 2004/0072597 A1 * | 4/2004 | Epperson et al. ............ 455/572 |
| 2004/0095895 A1 * | 5/2004 | Barnes ........................ 370/252 |
| 2004/0108901 A1 * | 6/2004 | Apel et al. ................... 330/285 |
| 2004/0114216 A1 * | 6/2004 | Huang et al. ........... 359/341.41 |
| 2004/0120639 A1 * | 6/2004 | Elbers et al. ................... 385/27 |

(Continued)

FOREIGN PATENT DOCUMENTS

WO    2007100974 A2    9/2007

(Continued)

OTHER PUBLICATIONS

CM09647J Cana Serial No. 2,642,224 Voluntary Amendment Dated Feb. 12, 2009—5 pages.

(Continued)

*Primary Examiner*—Pablo N Tran
(74) *Attorney, Agent, or Firm*—Barbara R. Doutre

(57) ABSTRACT

A transmitter (200) includes a plurality of amplifier "n" stages (202, 204, 206) providing predetermined gain stages and a plurality of filters (208, 210). Each filter (208, 210) is distributed between each gain stage (202, 204) (204, 206) so as to reject far out noise in accordance with the gain stage preceding that filter.

3 Claims, 2 Drawing Sheets

*200*

U.S. PATENT DOCUMENTS

| | | | |
|---|---|---|---|
| 2004/0196936 A1* | 10/2004 | Kawama et al. | 375/350 |
| 2004/0229586 A1* | 11/2004 | Oshima et al. | 455/240.1 |
| 2005/0107056 A1* | 5/2005 | Okasaka et al. | 455/251.1 |
| 2005/0275477 A1* | 12/2005 | Crawley | 331/57 |
| 2006/0001492 A1* | 1/2006 | Chang et al. | 330/306 |
| 2006/0066404 A1* | 3/2006 | Akamine et al. | 330/285 |
| 2006/0234668 A1* | 10/2006 | Uchitomi et al. | 455/333 |
| 2006/0267682 A1* | 11/2006 | Grebennikov | 330/51 |
| 2006/0290431 A1* | 12/2006 | Shimizu et al. | 330/307 |
| 2007/0082642 A1* | 4/2007 | Hattori | 455/286 |
| 2007/0146075 A1* | 6/2007 | Sekimoto et al. | 330/289 |
| 2007/0218844 A1* | 9/2007 | Alanen et al. | 455/73 |
| 2007/0296869 A1* | 12/2007 | Hall | 348/685 |

FOREIGN PATENT DOCUMENTS

| | | |
|---|---|---|
| WO | 2007100974 A3 | 9/2007 |

OTHER PUBLICATIONS

PCT International Preliminary Examination Report Application No. PCT/US2007/062052 Dated Sep. 12, 2008—6 pages.

PCT International Article 19 Amendment Application No. PCT/US2007/062052 Dated Feb. 28, 2008—11 pages.

PCT International Search Report Application No. PCT/US2007/062052 dated Jan. 15, 2008—7 pages.

* cited by examiner

METHOD AND APPARATUS FOR MINIMIZING NOISE IN A TRANSMITTER

FIELD OF THE INVENTION

The present invention relates generally to radio transmitters and more particularly to noise reduction in radio transmitters.

BACKGROUND

Transmitter noise can interfere with communication systems, such as public safety radio communication systems used in a mobile environment. Traditionally, filters have been used in the transmitter line-ups of such systems to reduce noise in the receiver band. Noise in the receiver band having an impact on transmitter performance can generally be referred to as far out noise. High power transmitters require filters that provide high rejection capability to reject far out noise. These filters can be costly and large in size making them undesirable in a production environment. While duplexers could be used to address the far out noise issue, in devices such as high power data (HPD) multi-band radios (35 Watts, 700/800 MHz), any duplexer that could handle the power and stringent noise specifications would be even larger and more costly than a filter.

FIG. 1 shows a traditional transmitter line-up 100 for a high power device including three gain stages 102, 104, 106 having a single filter 108 placed between two of the stages, here shown as stages 2 and 3. This filtering approach imposes restrictions on how the gain is distributed in the transmitter line-up as well as restrictions on the filter itself. For example, if there is too much gain before the filter 108, then the filter rejection will be insufficient to reduce noise in the receiver band. If there is too little gain before the filter 108, the transmitter will not meet power requirements. For the numerical examples provided in transmitter line-up 100, the amplifiers 102, 104 will amplify both the desired signal and the input noise by 50 dB before getting to the filter 108. Thus, filter 108 must also be able to handle high power. For a high performance data product, the filter ends up being extremely large, difficult to manufacture, costly and faces significant issues with placement in the assembly process.

Accordingly, it would be beneficial to have an improved transmitter line-up capable of handling far out noise.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
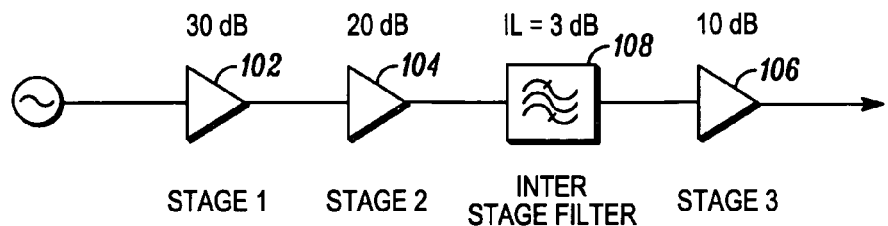
FIG. 1 is a prior art transmitter line-up for a communication device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the minimization of noise in a transmitter. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
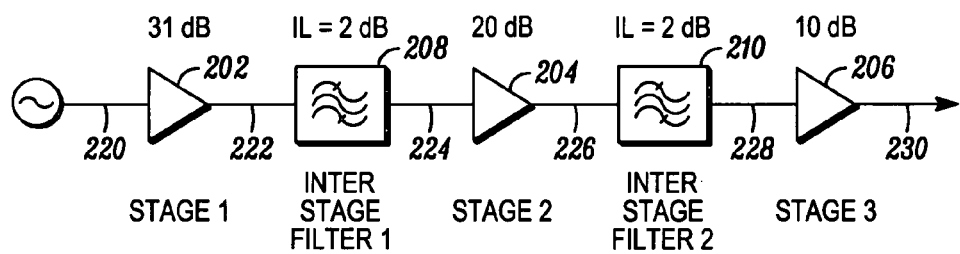
FIG. 2 is a transmitter line-up for a communication device formed in accordance with the present invention.

A method and apparatus for minimizing receiver band noise in a transmitter line-up of a communication device are disclosed herein in accordance with the present invention. FIG. 2 shows a transmitter line-up 200 for use in a high power device, such as a high power data device (HPD) used in public safety applications or the like. Transmitter line-up 200 includes a plurality of amplifiers 202, 204, 206 providing predetermined gain stages; stage 1, stage 2, stage 3. In accordance with the present invention, a plurality of filters 208, 210 are dispersed such that each filter is distributed between each gain stage. In accordance with the present invention, each filter 208, 210 rejects far out noise in accordance with the gain stage preceding that filter.

Numerical gain and insertion loss values associated with each stage of transmitter line-up 200 are provided for exemplary purposes only and can vary depending on application requirements. High power transmitter architectures that are easy to manufacture can now be achieved by distributing the transmitter into a plurality of gain stages and dispersing the filtering between the gain stages so that low cost surface mount filter devices can be used.

Taking an example through transmitter line-up 200, first stage 202 amplifies an input signal 220 at a first predetermined power level (31 dB) followed by first filter 208 filtering the amplified signal 222 with a rejection level (31 dB) sufficient to attenuate the first predetermined power level over a far out noise spectrum. Second stage 204 amplifies the filtered signal 224 with a second predetermined power level (20 dB) thereby providing a second stage amplified signal 226. Second filter 210 filters the second stage amplified signal 226 with a rejection level sufficient to attenuate the second predetermined power level over the far out noise spectrum thereby providing a second stage filtered signal 228. Third stage 206 amplifies the second stage filtered signal 228 with at a third predetermined power level (10 dB) thereby providing a third stage amplified signal 230.

Dispersing the filtering based on gain alters the rejection requirements of each filter. Although additional gain may be needed in the first stage 202, first filter 208 must only reject 31 dB of noise in the receiver band, and second filter 210 must only reject 20 dB of noise in the receiver band. The resultant architecture has proven to have better noise performance than a single filter design and reduces the overall cost of the transmitter. Though not shown, a third filter can be added at the end of stage 3, but depending on system requirements this may not be necessary.

When designing an architecture for a transmitter line-up, the selection of filter rejection level and gain of the gain stages along with insertion loss (IL) of each filter and filter bandwidth are taken into consideration. The rejection of each filter should be greater than or equal to the amount of gain of the preceding amplifier stage. The filter losses in the prior art example of FIG. 1 are shown as totaling 3 dB. In FIG. 2, the transmitter line-up 200 included two filters each having 2 dB of insertion loss totaling 4 dB. An extra 1 dB of gain was used in the first stage 202 to compensate for this additional loss, thus stage one amplifier 202 is shown as having 31 dB of gain. Depending on the insertion loss of the filters selected, the gain stages can be modified as appropriate. Filter bandwidth is selected such that intermodulation with the carrier does not place far out noise in the receiver band.

Figure 3:
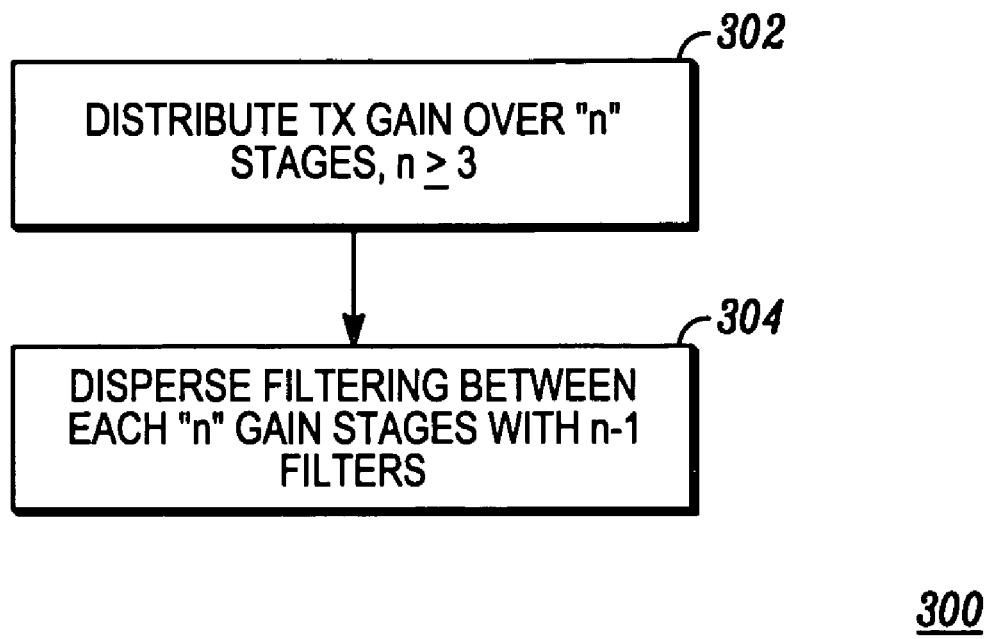
FIG. 3 shows a flowchart summarizing a method of forming an architecture for a transmitter line-up in accordance with an embodiment of the invention.

FIG. 3 shows a flowchart 300 summarizing a method of forming an architecture for a transmitter line-up such as that shown in FIG. 2. Method 300 begins by distributing the transmitter gain over "n" stages, n being greater than or equal to three (step 302); and dispersing the filtering between each of the "n" gain stages with n−1 filters (or n filters if necessary) (step 304). The filter rejection at step 304 should be greater than or equal to the gain of the preceding gain stage. This technique provides an architecture having a plurality of gain stages dispersed throughout the transmitter line-up with a plurality of filters dispersed therebetween. Each filter rejects noise over a far out noise spectrum using a rejection level based on the preceding gain stage to provide a transmitter line-up that can readily meet noise rejection requirements.

By individually filtering each gain stage, a transmitter line-up can be formed that provides ease of assembly and low cost advantages to high power products, such as mobile radio systems. The method and apparatus for creating an architecture for a transmitter line-up provided by the present invention thus facilitates the design of high power devices, such as 35 Watt, 700/800 MHz radios and data terminals and the like.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A transmitter, comprising:
   a plurality of amplifier stages providing predetermined gain stages that amplify both a desired signal and receiver band noise in a transmit path; and
   a plurality of filters, each filter being distributed between each gain stage, each filter rejecting the receiver band noise in accordance with the gain stage preceding that filter, wherein each of the plurality of filters has a rejection level greater than or equal to a gain of the predetermined gain stage preceding that filter.

2. A method for creating an architecture for a transmitter line-up comprising:
   dispersing a plurality of gain stages throughout the transmitter line-up that amplify both a desired signal and receiver band noise; and
   individually filtering each gain stage with a filter having a rejection level sufficient to attenuate receiver band noise at each gain stage, wherein the step of individually filtering further includes the step of providing a filter rejection level for each filter which is greater than or equal to the gain of a preceding gain stage.

3. A transmitter-line up architecture, comprising:
   plurality of gain stages dispersed throughout the transmitter line-up; and
   a plurality of filters dispersed therebetween, wherein each filter rejects noise over a far out noise spectrum within a receiver band using a rejection level based on a preceding gain stage, wherein each of the plurality of filters has a rejection level greater than or equal to the gain of a preceding gain stage.

* * * * *